Oct. 17, 1961  J. L. MORRIS  3,004,781
SLOTTED SHELL COUPLING CLAMP

Filed Jan. 29, 1959  2 Sheets-Sheet 1

INVENTOR.
Jolly L. Morris
BY
HIS ATTORNEYS

Oct. 17, 1961   J. L. MORRIS   3,004,781
SLOTTED SHELL COUPLING CLAMP
Filed Jan. 29, 1959   2 Sheets-Sheet 2

INVENTOR.
Jolly L. Morris
BY
HIS ATTORNEYS

United States Patent Office 3,004,781
Patented Oct. 17, 1961

3,004,781
SLOTTED SHELL COUPLING CLAMP
Jolly L. Morris, R.D. 1, Cabot, Pa.
Filed Jan. 29, 1959, Ser. No. 789,867
10 Claims. (Cl. 285—369)

This invention relates to fluid conduit couplings and more particularly, to an improved coupling clamp for operatively connecting pipe lines used for conducting water, gas or other liquids and fluids.

In previously known types of pipe clamps it has been customary to utilize a unitary, longitudinally-split, outer shell that is clamped together along the longitudinal split. This type of clamp, illustrated in my Patent No. 2,227,-551, provides a uniform clamping and sealing action on the ends of the pipe members being coupled. However, it is difficult to provide a selective or controlled clamping action on the coupled pipe ends which will compensate for longitudinal pull exerted on the pipes and which will also compensate for irregularities within the pipe ends. I have thus developed an improved form of coupling to meet this problem.

It thus has been an object of my invention to provide a simple and effective coupling clamp which is capable of being easily applied to sections of pipe to be coupled, and which is not only capable of producing a fluid-tight joint between such pipe sections, but also is capable of providing a controlled, rigid connection between the pipe sections;

A further object of my invention has been to provide a coupling clamp which may be pre-assembled, and when so assembled, may be easily and effectively applied to the end of pipes to be coupled;

A still further object of my invention has been to provide a coupling clamp which will not only compensate for irregularities in the ends of the pipes to be coupled, but will also compensate for expansion and contraction of the pipes during use;

A still further object of my invention has been to provide an improved coupling clamp having circumferentially-extending slits adjacent each longitudinal end providing contractible end clamping portions, each of which is provided with a center-punched locking ring;

These and other objects and advantages derived from my invention will appear to those skilled in the art from the following description taken in connection with the accompanying drawings in which.

Figure 1:
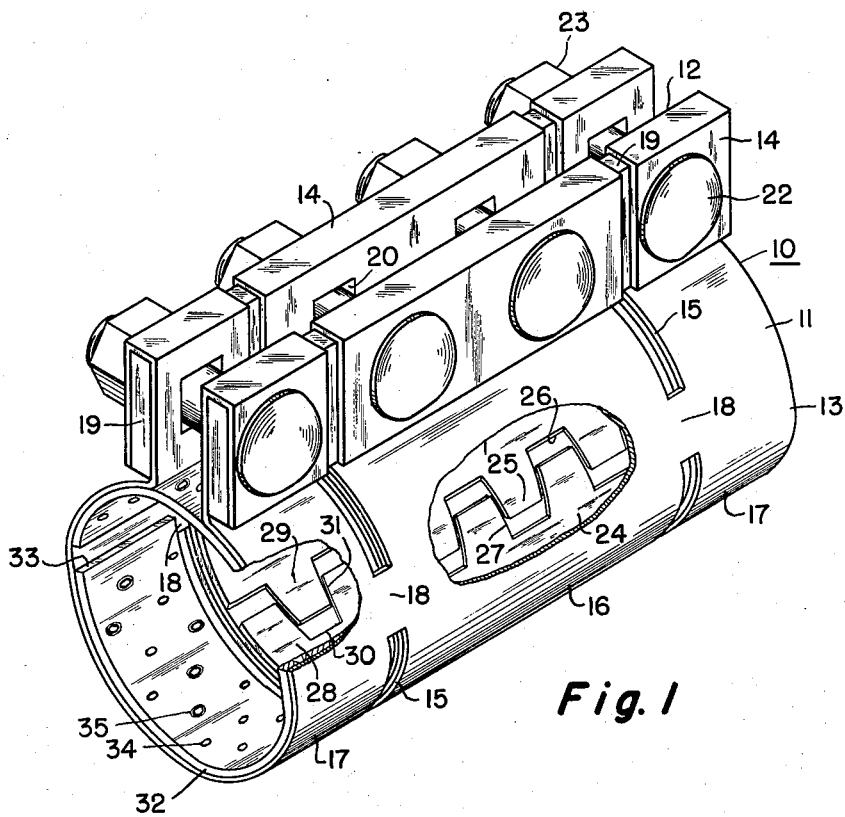
FIGURE 1 is a perspective view of a coupling clamp embodying my invention in an open or flexed position, with the shell member and locking ring broken away at one end, and with the shell member broken away in the center to expose parts located therebeneath.

I have devised a new and improved coupling clamp having slotted portions in the outer shell, adjacent each longitudinal end of the clamp, to provide contractible end clamping portions for gripping fluid conduit or pipe members. In addition, the end clamping portions are provided with locking rings having frictional gripping surfaces for frictionally engaging the outer shell and the pipe member to securely clamp and hold the pipe member in place when the end clamping portions are tightened.

Referring now to the drawings, coupling clamp 10 has an outer shell 11 of a suitable flexible and strong material such as steel, that is longitudinally split at 12. The outer shell 11 comprises a unitary cylindrical or sleeve portion 13 having flexed-apart, opposed, U-shaped, longitudinally or axially extending side flange portions or washer housings 14 that are positioned adjacent the longitudinal split 12. The outer shell 11 is provided with a plurality of transversely or peripherally-extending slots, recesses or cut-away segments or portions 15, spaced-apart from each longitudinal end, which slots extend through both the side flange portions 14 and the cylindrical portion 13. The slotted portions 15 divide the cylindrical portion 13 into a larger central cylindrical portion 16 and integral end clamping portions 17 of lesser longitudinal extent connected thereto by web or banding portions 18.

Figure 3:
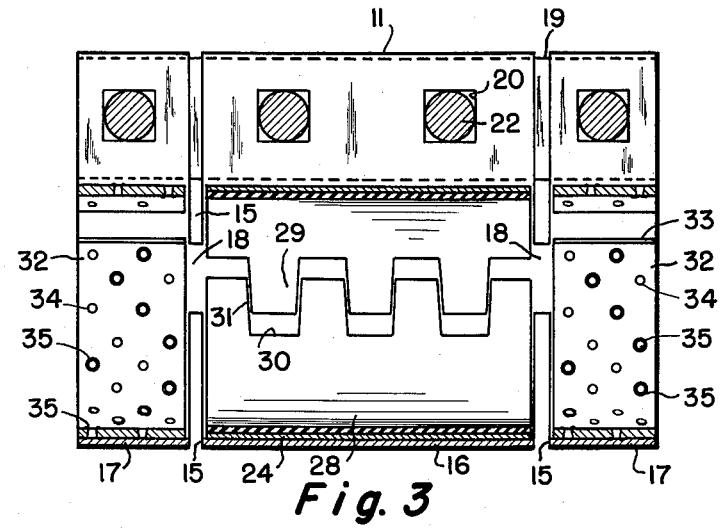
FIGURE 3 is a sectional view in elevation taken along lines III—III of FIGURE 2, but with the pipe member omitted.

A longitudinally-extending strip or washer member 19 is provided in each of the opposed U-shaped flange portions 14 to strengthen the flanges and give added rigidity thereto when the outer shell is contracted and tightened on pipe ends. The side flanges or washer housings 14 are provided with transversely-aligned and longitudinally spaced-apart, square bores 20, and the longitudinal strips 19 are provided with complementary square bores 21 positioned in alignment with the bores 20. Square neck carriage bolts 22 extend through the aligned bores 20 and 21 in the opposed, U-shaped flanges 14 and are held against rotation by the square bores 20 and 21 in the flanges 14, adjacent the square neck of bolts 22. The bolts 22 are provided with nuts 23 for tightening and clamping the flange portions 14 together and thereby compressing the outer shell 13 on endwise-entered pipe members. Each bolt 22 is provided with a coil spring 23a (see FIGURE 3) between the nut 23 and its adjacent flange portion 14, to compensate for expansion and contraction of the coupled pipe members during use. This feature is extremely useful where the ambient temperature adjacent the coupling installation may vary over a wide range, especially since my improved coupling clamp is adapted for use on all types of pipes, including metallic and plastic pipes.

Figure 4:
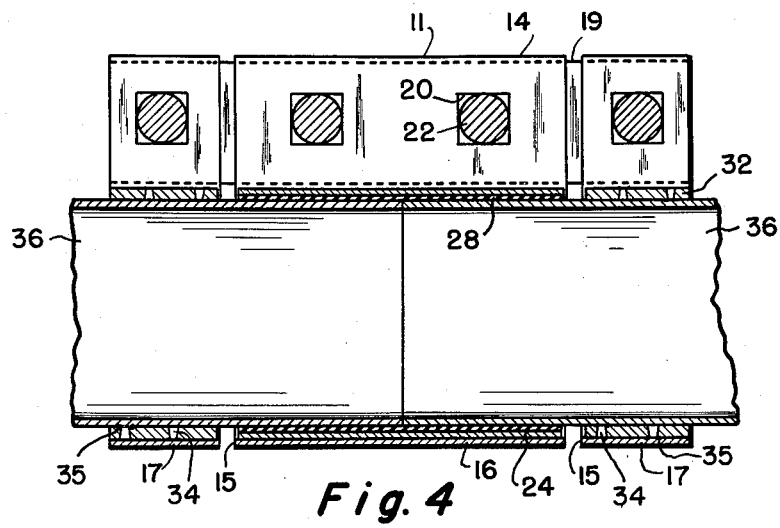
FIGURE 4 is a side elevational view in section taken along lines III—III, but showing the position of the clamping end portions when they are closed or tightened down on pipe members.

The central cylindrical portion 16 of the cylindrical or sleeve portion 13 is provided with a longitudinally-split cylindrical inner sleeve member 24, preferably of rolled metal, such as steel. The inner sleeve member 24 has opposed interlocking tongues 25 and grooves 26 formed along the split which are compressed into and flexed out with respect to each other as the coupling is tightened and loosened, respectively. Edges 27 of the tongues and grooves are tapered to assure an easily slidable in and out relationship, and so that the side edges of the opposed groups of tongues and grooves come into close abutment when the clamp is tightened and contracted over the ends of the pipes, such as pipes 36, illustrated in FIGURE 4.

A longitudinally-split cylindrical gasket 28, made of any suitable material, such as asbestos, flexible plastic or rubber, is positioned within the cylindrical inner sleeve member 24. The gasket 28 is also provided with opposed interlocking tongues 29 and grooves 30 along the split which are positioned in an offset or staggered relationship with respect to the interlocking tongues and grooves of the inner sleeve member 24. The opposed interlocking tongues 29 and grooves 30 of the gasket 28 are provided with tapered edges 31, similar to the tapered edges 27, to provide a sliding sealing engagement with each other when the coupling clamp is tightened-down on pipe ends.

Each of the end clamping portions 17 is provided with a flexed-apart, split, rough-surfaced, locking ring, such as center-punched locking ring 32 of a suitable flexible material, such as cold rolled steel. The locking rings 32 have spaced-apart or slit side portions 33 and a plurality of center-punched holes 34 that are punched through the ring from opposite sides. Each hole 34 has an upset 35 adjacent the hole on the outward side of the punch, which upset provides a rough, frictional gripping surface. The upsets on the outer side of the locking rings frictionally engage the inner surface of the end clamping portions, while the upsets on the inner surface of the locking rings frictionally engage and grip the ends of the pipe members to be coupled, when the clamp is tightened.

The locking rings 32 will always be slightly thinner than the combined thickness of the cylindrical inner sleeve member 24 and the gasket 28, so that the gasket 28 will form a perfect seal about or with the ends of the pipe members to be coupled. Since the end clamping portions 17 are partially separated from the central cylindrical portion 16 by means of the slots 15, the end clamping portions are easily contractible and tightened-down upon end portions of the pipe members to provide a highly effective, bounding gripping action. Although the central cylindrical portion 16 cannot be compressed or tightened-up to the extent which the split end portions can be contracted, the central cylindrical portion is tightened sufficiently to provide an effective sealing action between the ends of the pipe members 36 and the gasket 28.

The split, center-punched locking rings are preferably made from cold-rolled steel strip and are formed with sufficient inherent tension, so that they are locked in place within the end clamping portions, to allow the pipe members to be slid into the coupling without contacting the locking ring when the coupling clamp is in its open or flexed position. I have found that the end clamping portions are most easily tightened when the spaced-apart portions 33 of the locking rings 32 are just offset from the longitudinal split 12 of the outer shell 11, note FIGURES 1 and 2. In addition, I have found that optimum contraction is obtained in the cylindrical inner sleeve member 24, when the opposed interlocking tongues 25 and grooves 26 are just offset from the longitudinal split 12 of the shell 11. Although the coupling clamp 10 is most easily tightened when the inner sleeve 24 is thus positioned, the coupling is operable when the interlocking tongues 25 and grooves 26 are oriented in other positions. It is important, however, that the interlocking tongues 29 and grooves 30 of the gasket 28 be offset from the interlocking tongues 25 and grooves 26 of the inner sleeve 24, in order to provide an effective sealing of the pipe members by the gasket 28.

Figure 2:
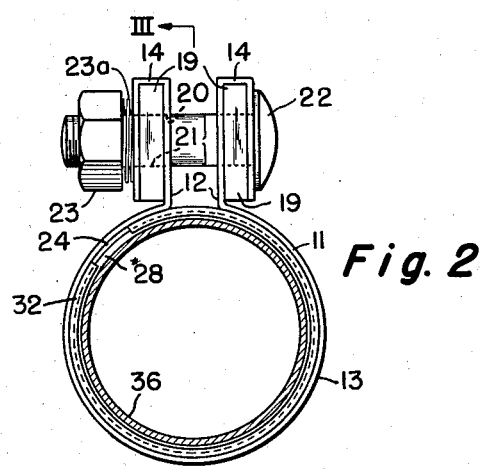
FIGURE 2 is a left-hand end view of FIGURE 1, showing the position of the clamp on a pipe member when the clamp is in its open or flexed position.

In operation, the nuts 23 on the coupling clamp are loosened, so that the clamp is in its open or flexed position, as shown in FIGURES 1 and 2. The clamp is then slid over one end of a pipe member to be coupled, and an adjacent end of another pipe member to be coupled is inserted within the clamp. Since the locking rings 32 are tensioned outwardly against the inner surface of the end clamping portions 17, and further, since the thickness of the locking rings is less than the combined thickness of the sleeve 24 and gasket 28, they do not interfere with the insertion of pipe members 36 within the coupling clamp. After the pipe members 36 have been so inserted, the bolts 23 on the center portion are tightened against compression springs 23a, to provide a full sealing action around or about the ends of the coupled pipe members. As the center portion is tightened downwardly, the interlocking tongues 25 and grooves 26 of the cylindrical inner sleeve 24 are slid into an intermeshing relationship to an extent proportional to the amount of contraction of the central cylindrical portion 16. Likewise the opposed interlocking tongues 29 and grooves 30 of the gasket 28 are also moved into a tight, intermeshing relationship from the loose and flexed intermeshing relationship of FIGURE 3.

The nuts 23, adjacent the end clamping portions 17, are also tightened against the compression spring 23a and flanges 14. As the side clamping portions are tightened downwardly onto the ends of the pipe members 36, the center-punched locking rings 32 are clamped against the pipe members. Due to the jagged upset portions 35, adjacent the center-punched holes 34, the pipe members are securely gripped and retained by the locking rings. In addition, the upset portions 35 on the outside of the locking rings frictionally engage the inside surface of the end clamping portions 17. Since the end clamping portions are separated from the cylindrical portions by the slots 15, the end portions are free to contract up to 1/16 of an inch more than the central cylindrical portion, and compensate for irregularities in the end of the pipe members being coupled. In addition, the coil springs 23a eliminate troubles normally encountered with expansion and contraction of the pipe members during usage.

When utilizing a coupling clamp, as illustrated in FIGURE 1, for coupling pipes having a diameter of 2½ inches, I have been able to subject the coupling clamp to fluid pressures up to 1,150 pounds per square inch before the coupling shows any signs of leakage. In addition, the coupling illustrated in FIGURE 1 has been able to withstand 4,700 pounds pull before showing signs of "give," thus illustrating the effective clamping action derived from the end clamping portions 17. These phenomenal fluid pressure and pull strengths are derived from my new and improved structure in coupling clamps, as devised in accordance with my invention.

Although I have described and illustrated a preferred embodiment of my invention, it will be apparent to those skilled in the art that various changes and modifications may be made, without departing from the principles thereof, as indicated by the appended claims.

Having thus described my invention, what I claim is:

1. An improved coupling clamp for connecting adjacent end portions of a pair of fluid conduits in a sealing relationship comprising, sealing means encompassing end portions of the conduits, backing means encompassing said sealing means, metallic friction ring means encompassing the conduits adjacent opposite ends of said sealing means, a unitary longitudinally-split outer shell member encompassing said friction ring means and said backing means and having circumferentially extending slotted portions extending through said shell member intermediate said backing means and said friction ring means to provide end clamping portions on the shell, and means for selectively contracting portions of said shell member about said friction ring means and about said backing means independently of each other to provide a controlled gripping and sealing action about the end portions of the conduits.

2. An improved coupling clamp for connecting adjacent end portions of a pair of fluid conduits in a fluid-tight relationship, comprising sealing means encompassing the end portions of the fluid conduits, backing means encompassing said sealing means, metallic locking rings having upset portions on their inner and outer surfaces encompassing the conduits adjacent opposite ends of said sealing means, a unitary longitudinally-split outer shell member encompassing said locking rings and said backing means, said outer shell member having a plurality of circumferentially-extending slotted portions extending therethrough intermediate said locking rings and said backing means, and means for selectively contracting said outer shell member about said locking rings to contract said locking rings and provide a controlled gripping action on the conduit members independently of said sealing means and for contracting said outer shell about said backing means to contract said backing means and said sealing means to provide a controlled fluid-tight seal between the ends of the conduit members independently of the pressure exerted by said locking rings.

3. In a coupling clamp for connecting adjacent end portions of a pair of fluid conduits in a fluid-tight relationship, wherein the end portions of the fluid conduits are encompassed within a sealing gasket and a backing means, the improvement comprising, a unitary longitudinally-split outer shell member having a central portion encompassing the backing means and the gasket, circumferentially-extending slotted portions formed in said outer shell member adjacent opposite ends of the backing means, a pair of end clamping portions on said outer shell member extending longitudinally-outwardly from said slotted portions and beyond opposite ends of said backing means, metallic locking ring means within said pair of end clamping portions and encompassing the fluid conduits for frictionally engaging inner surfaces of said end clamping portions and outer surfaces of the conduit members, and means for selectively contracting said end clamping portions about said locking means to tightly engage and clamp the conduit members together and for independently contracting said outer shell member about the backing means to contract the backing means and gasket about the end portions of the conduit members and provide an effective fluid-tight seal therebetween.

4. In a coupling clamp for connecting adjacent end portions of a pair of fluid conduits together in a fluid-tight sealing relationship, having a gasket member surrounding end portions of the fluid conduits, and having a backing member surrounding the gasket member, the improvement comprising, a unitary longitudinally-split outer shell member encompassing the backing member, a pair of circumferentially-extending slotted portions dividing said outer shell member into a central cylindrical shell portion and a pair of easily-contractible end clamping portions adjacent each end of said central cylindrical portion, said central cylindrical portion being of sufficient longitudinal length to completely encompass the backing member, said end clamping portions extending longitudinally outwardly beyond the backing member, metallic clamping means having internal and external upset portions positioned within said end clamping portions and surrounding the fluid conduits for frictionally engaging inner surface portions of said end clamping portions and outer surface portions of the conduit members, and resilient means responsive to thermal expansion and contraction of the fluid conduits for selectively contracting a portion of said outer shell about said clamping means to tightly grip and secure the conduit members together independently of the pressure exerted on the gasket and for independently contracting a portion of said outer shell about the backing member to contract the gasket into a fluid-tight sealing relationship with the end portions of the conduit members independently of the compression exerted on said clamping means.

5. A coupling clamp for connecting adjacent ends of a pair of fluid conduit members in a fluid-tight sealing relationship comprising, sealing means encompassing end portions of the conduits, backing means encompassing said sealing means, a unitary longitudinally-split outer shell member having a central cylindrical portion encompassing said backing member and end clamping portions extending longitudinally outwardly therefrom, arcuately-extending slotted portions formed radially through said outer shell member between said central cylindrical portion and said end clamping portions, metallic locking ring means positioned within said end clamping portions, said locking ring means having upset portions for frictionally engaging inner surfaces of said end clamping portions and outer surfaces of the conduit members, longitudinally-extending and transversely-slotted opposed flange portions formed integral with said outer shell member adjacent its longitudinal slit, spring tensioned means responsive to thermal expansion and contraction of the conduit members and extending through said opposed flange portions for selectively contracting said central cylindrical portion about said gasket to effect a fluid-tight seal about the ends of the conduit members and for independently contracting said end clamping portions about said locking means to operably grip and retain the conduit members together while compensating for expansion and contraction of the fluid conduit members.

6. A coupling clamp as defined in claim 5 wherein said spring tensioned means comprises, a plurality of carriage bolts extending through cooperating bores formed in said opposed flanges, a nut threadingly engaging one end of each bolt, and a high compression coil spring positioned on each said bolt between said nut and its adjacent flange whereby thermal contraction or expansion in the coupled conduit members will be compensated by the high compression spring.

7. An improved coupling clamp for connecting adjacent ends of fluid conduits to form a fluid-tight joint therebetween comprising, gasket means surrounding the adjacent ends of the conduit members, backing means overlying said gasket means for contracting said gasket means into a fluid-tight sealing relationship with the ends of said conduit members, a longitudinally-split outer shell overlying said backing means, a plurality of slotted portions extending transversely through said shell, parallel to and in a spatial relationship with the longitudinal ends thereof, end clamping portions formed longitudinally-outwardly of said slotted portions on opposed ends of said outer shell; metallic locking ring means within said end clamping portions for frictionally engaging both said end clamping portions and end portions of the conduit members, and means for selectively contracting said outer shell to effect a sealing action between the ends of the fluid conduits by compressing said gasket therearound and to independently effect a clamping action on the adjacent conduit ends by compressing said metallic locking ring means thereagainst.

8. A coupling clamp adapted to be positioned over adjacent ends of axially-aligned conduits of substantially the same external diameter and, when so positioned, to clamp the conduits together to form a fluid-tight joint between the adjacent ends thereof, comprising a longitudinally-slit gasket overlying adjacent ends of the conduits, interfitting tongue and groove portions in said gasket adjacent its longitudinally-extending slit, a cylindrical longitudinally-slit sleeve member positioned over said gasket, interfitting tongue and groove portions formed in said sleeve member along the longitudinally-extending slit and positioned in a circumferentially spaced relationship from the interfitting tongue and groove portions of said gasket, a longitudinally-slit substantially cylindrical metal shell surrounding said sleeve with the inner peripheral surface thereof engaging and confining the interfitting tongue and groove portions of said sleeve, opposed longitudinally-extending flange portions formed along each longitudinal edge of said shell adjacent its longitudinally-extending slit, slotted portions extending transversely through said shell and spaced-apart from each longitudinal end thereof to divide the shell into a central cylindrical portion and end clamping portions, a punched metallic locking ring positioned within each of said end clamping portions adjacent a conduit to frictionally engage both said end clamping portion and the conduit, and means extending through said flange portions for selectively contracting said shell and forcing the interfitting tongue and groove portions of said gasket and said sleeve into wedging engagement with each other to seal the adjacent ends of the conduits in a fluid-tight joint and for independently forcing said shell about said locking rings to securely clamp the adjacent ends of the conduits together.

9. An improved coupling clamp for connecting adjacent end portions of a pair of pipe members in a fluid-tight and rigid connection comprising, a gasket member encompassing end portions of the pipe members, an inner sleeve member encompassing said gasket, a longitudinally-split outer shell having a central cylindrical portion encompassing said inner sleeve member, a plurality of slotted portions formed in said outer shell adjacent opposite end portions of said inner sleeve member, end clamping portions secured to said central cylindrical portion adjacent said slotted portions, center-punched metallic locking rings frictionally engaging inner surfaces of said end clamping portions and outer surfaces of the pipe members, opposed longitudinally-extending flange portions formed integral with said outer shell adjacent its longitudinal split, longitudinally-extending washer bars operatively retained by said opposed flange portions, spring tensioned means extending through said flange portions for selectively contracting said outer shell about said end clamping portions to contract said locking rings about outer surface portions of the pipe members to effectively grip and connect the pipe members together, and for independently contracting said outer shell about said inner sleeve member to compress said inner sleeve member and said gasket about the end portions of the pipe members and effectively seal the connection between the pipe members, and said spring tensioned means compensating for thermal contraction and expansion of the pipe members within the coupling.

10. A coupling clamp for connecting adjacent ends of a pair of fluid conduit members in a fluid-tight sealing relationship comprising, sealing means encompassing end portions of the conduits, backing means encompassing said sealing means, a unitary longitudinally-split outer shell member having a central cylindrical portion encompassing said backing member and end clamping portions extending longitudinally outwardly therefrom, arcuately-extending slotted portions formed radially through said outer shell member between said central cylindrical portion and said end clamping portions, locking means positioned within said end clamping portions, longitudinally-extending and transversely-slotted opposed flange portions formed integral with said outer shell member adjacent its longitudinal slit, spring tensioned means responsive to thermal expansion and contraction of the conduit members and extending through said opposed flange portions for selectively contracting said central cylindrical portion about said gasket to provide a fluid-tight seal and for contracting said end clamping portions about said locking means to provide an operable gripping action on the conduit members while compensating for expansion and contraction of the fluid conduit members, and said locking means comprising a pair of split metallic locking rings having a plurality of center-punched holes formed through opposite sides thereof, and a frictional engagement upset surrounding the exit end of the center-punched holes.

References Cited in the file of this patent

UNITED STATES PATENTS

| | | |
|---|---|---|
| 1,956,846 | Williams | May 1, 1934 |
| 2,027,824 | Hunt | Jan. 14, 1936 |
| 2,227,551 | Morris | Jan. 7, 1941 |
| 2,396,491 | Chamberlain | Mar. 12, 1946 |
| 2,490,316 | Ostrak | Dec. 6, 1949 |
| 2,806,724 | Anspach | Sept. 17, 1957 |

FOREIGN PATENTS

| | | |
|---|---|---|
| 5,240 | Great Britain | Apr. 7, 1915 |